(12) United States Patent
DiCarlo et al.

(10) Patent No.: US 6,364,639 B1
(45) Date of Patent: *Apr. 2, 2002

(54) PUMP

(75) Inventors: Leonard J. DiCarlo; Paul G. Conley, both of St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,388

(22) Filed: Jun. 30, 2000

Related U.S. Application Data (63) Continuation-in-part of application No. 09/151,526, filed on Sep. 11, 1998, now Pat. No. 6,102,676.

(51) Int. Cl.[7] .......................... F04B 19/02; F04B 53/00
(52) U.S. Cl. ..................... 417/460; 417/468; 417/555.1
(58) Field of Search ................................ 417/460, 468, 417/555.1, 554

(56) References Cited

U.S. PATENT DOCUMENTS

| | | | |
|---|---|---|---|
| 2,187,684 A | 1/1940 | Fox et al. | 103/218 |
| 2,439,763 A | 4/1948 | Zieschang | 103/192 |
| 2,631,756 A | 3/1953 | Fox et al. | 222/82 |
| 2,636,441 A | 4/1953 | Woelfer | 103/48 |
| 2,787,225 A | 4/1957 | Rotter | 103/195 |
| 2,895,421 A | 7/1959 | Peeps | 103/50 |
| 3,469,532 A | 9/1969 | Wegmann et al. | 103/178 |
| 3,502,029 A | 3/1970 | Halladay | 103/57 |
| 3,906,845 A | 9/1975 | Wegmann | 92/168 |
| 3,945,772 A | 3/1976 | Van de Moortele | 417/489 |
| 4,243,361 A | 1/1981 | Groff | 417/554 |
| 4,487,340 A | 12/1984 | Shaffer | 222/385 |
| 4,762,474 A | 8/1988 | Dartnall | 417/469 |
| 4,804,109 A | 2/1989 | Vanderjagt | 222/38 |
| 5,009,000 A | 4/1991 | Wilmeth et al. | 29/888.02 |
| 5,655,885 A | 8/1997 | Chung | 417/44.2 |
| 5,692,650 A | 12/1997 | Wolter et al. | 222/321.9 |
| 6,102,676 A | 8/2000 | DiCarlo et al. | 417/460 |

FOREIGN PATENT DOCUMENTS

FR    2566052    12/1985

OTHER PUBLICATIONS

Operating Instructions entitled Flowmaster ™ Rotary Driven Hydraulic Pump Models: 85480, 85481, 85482 and 85483 Series "A", Feb. 1999.

*Primary Examiner*—Andrew M. Dolinar
*Assistant Examiner*—Arnold Castro
(74) *Attorney, Agent, or Firm*—Senniger, Powers, Leavitt & Roedel

(57) ABSTRACT

A lance pump, particularly for lubricant, having a fixed plunger and a pump tube reciprocable in cycles through an outward stroke and an inward stroke on each cycle on the plunger, operable to deliver metered charges of lubricant on each outward stroke as well as on each inward stroke.

16 Claims, 13 Drawing Sheets

PUMP

REFERENCE TO RELATED APPLICATION

This application is a continuation-in-part of application Ser. No. 09/151,526, filed Sep. 11, 1998, issued Aug. 15, 2000 as U.S. Pat. No. 6,102,676.

BACKGROUND OF THE INVENTION

This invention relates to pumps, more particularly to an expansible chamber pump of a type which may be referred to as a lance pump, particularly adapted for pumping lubricant, including grease, from a supply thereof (e.g. lubricant in a drum).

The pump of this invention is generally in the same field as the pumps shown in the following U.S. patents:

Patent No. Issue Date Title
1. U.S. Pat. No. 2,187,684 Jan. 16, 1940 Lubricating
2. U.S. Pat. No. 2,631,756 Mar. 17, 1953 Apparatus
3. U.S. Pat. No. 2,636,441 Apr. 28, 1953 Lance Type Pump Mounting
4. U.S. Pat. No. 2,787,225 Apr. 2, 1957 Lubricant Pump
5. U.S. Pat. No. 3,469,532 Sep. 30, 1969 Pump
6. U.S. Pat. No. 3,502,029 Mar. 24, 1976 Pumps
7. U.S. Pat. No. 3,945,772 Mar. 23, 1976 Pumps For Transferring Small Quantities Of Dosed Liquids
8. U.S. Pat. No. 4,487,340 Dec. 11, 1984 Adjustable Metering Oil Pump
9. U.S. Pat. No. 4,762,474 Aug. 9, 1988 Pump Having Reciprocating Pipe And Slidably Supported Hollow Body The pumps shown in items 2, 4 and 5 listed above are identified as lance pumps.

BRIEF SUMMARY OF THE INVENTION

Among the several objects of this invention may be noted the provision of an improved pump generally of the lance pump type especially adapted for operation at relatively high speed, e.g. 600 cycles per minute, in respect to prior pumps of this type; the provision of such a pump especially adapted for more reliable pumping of hard-to-pump grease, including pumping of grease which is thicker because of being subject to low temperature; the provision of such a pump operable with a relatively short pump stroke (e.g. 0.75inches) and with relatively high volumetric efficiency, i.e. higher volume delivery in relation to the size of the pump; the provision of such a pump adapted for operation by a rotary hydraulic motor and especially by a readily commercially available rotary hydraulic motor instead of a special driving means, for cost reduction; the provision of such a pump which is double-acting, i.e. operable to deliver a metered volume of lubricant on an outward stroke as well as an inward stroke; and the provision of such a pump which is especially suitable for use in an automated lubrication system wherein metered charges of lubricant are delivered to different points of lubrication which may require different amounts of lubricant at different time intervals.

In general, a pump of this invention, for pumping a pumpable product, particularly lubricant including grease, from a supply thereof, comprises a head adapted for placement above or at one side of said supply, an elongate member constituting a pump plunger extending outward from the head having an inner end and an outer end, said plunger being fixed at its inner end with respect to the head, an elongate pump tube surrounding the plunger extending out from adjacent the inner end of the plunger to and outside the outer end of the plunger and reciprocable in and out through a pump stroke relative to the plunger, and motor-driven means associated with the head for reciprocating the tube through said pump stroke between an inner position relative to the plunger and an outer position relative to the plunger. The tube has an inner end closure slidable in and out on an inner portion of the plunger adjacent the inner end of the plunger in sealed relation thereto, and an outer closure slidable in and out on an outer portion of the plunger adjacent the outer end of the plunger in sealed relation thereto, closing the tube inside its outer end. The tube is of larger internal cross-section than the cross-section of the plunger throughout the length of the tube between said closures thereby defining an elongate annular pump chamber between the plunger and tube extending from said inner end closure to said outer closure. The tube is open at its outer end and has an inlet check valve adjacent its said open outer end outside the outer end of the plunger defining in conjunction with the outer end of the plunger an expansible and contractible outer end chamber. The cross-sectional area of said inner portion of the plunger is different from the cross-sectional area of said outer portion of the plunger. The inlet check valve opens on an outward stroke of the tube for entry of the pumpable product to said outer end chamber. The pump has a passage for outflow of pumpable product from said elongate annular pump chamber to and through an outlet in the head on an outward stroke and also on an inward stroke of the tube, and further has a passage with a check valve therein adapted to open on each inward stroke of the tube with the inlet check valve closed for delivery of pumpable product from said outer end chamber to said elongate annular pump chamber.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
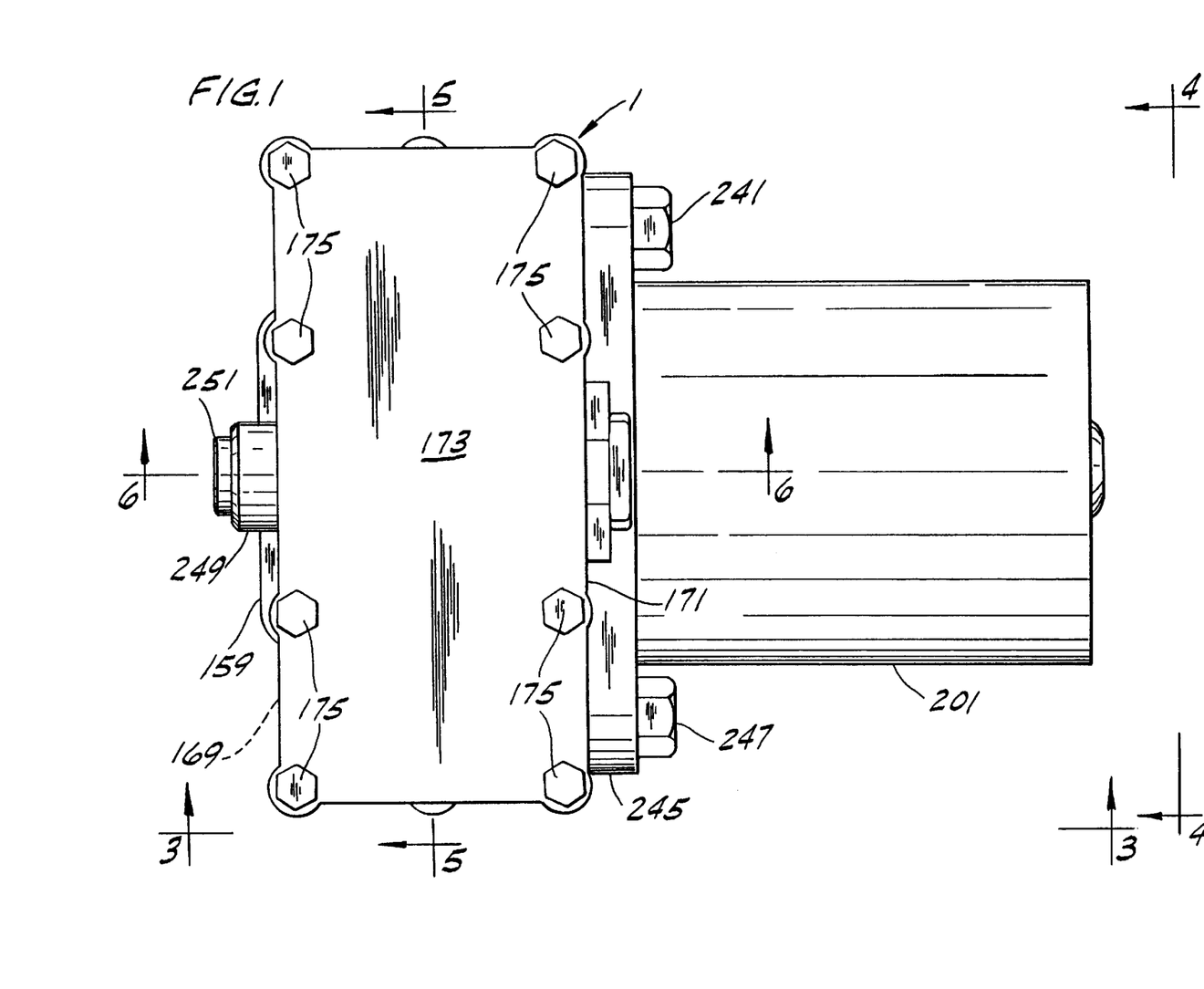
FIG. 1 is a top plan view of a pump of this invention.
Figure 2:
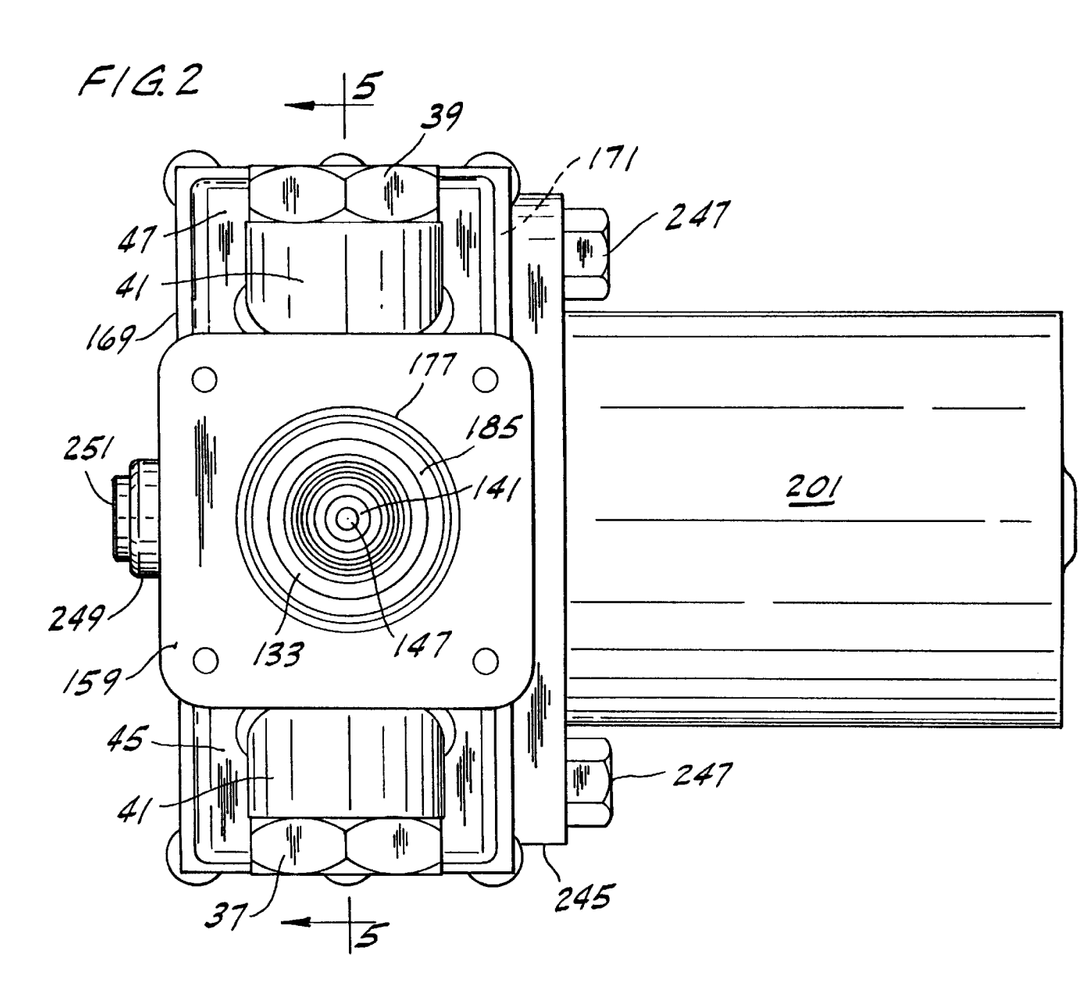
FIG. 2 is a bottom plan view.
Figure 3:
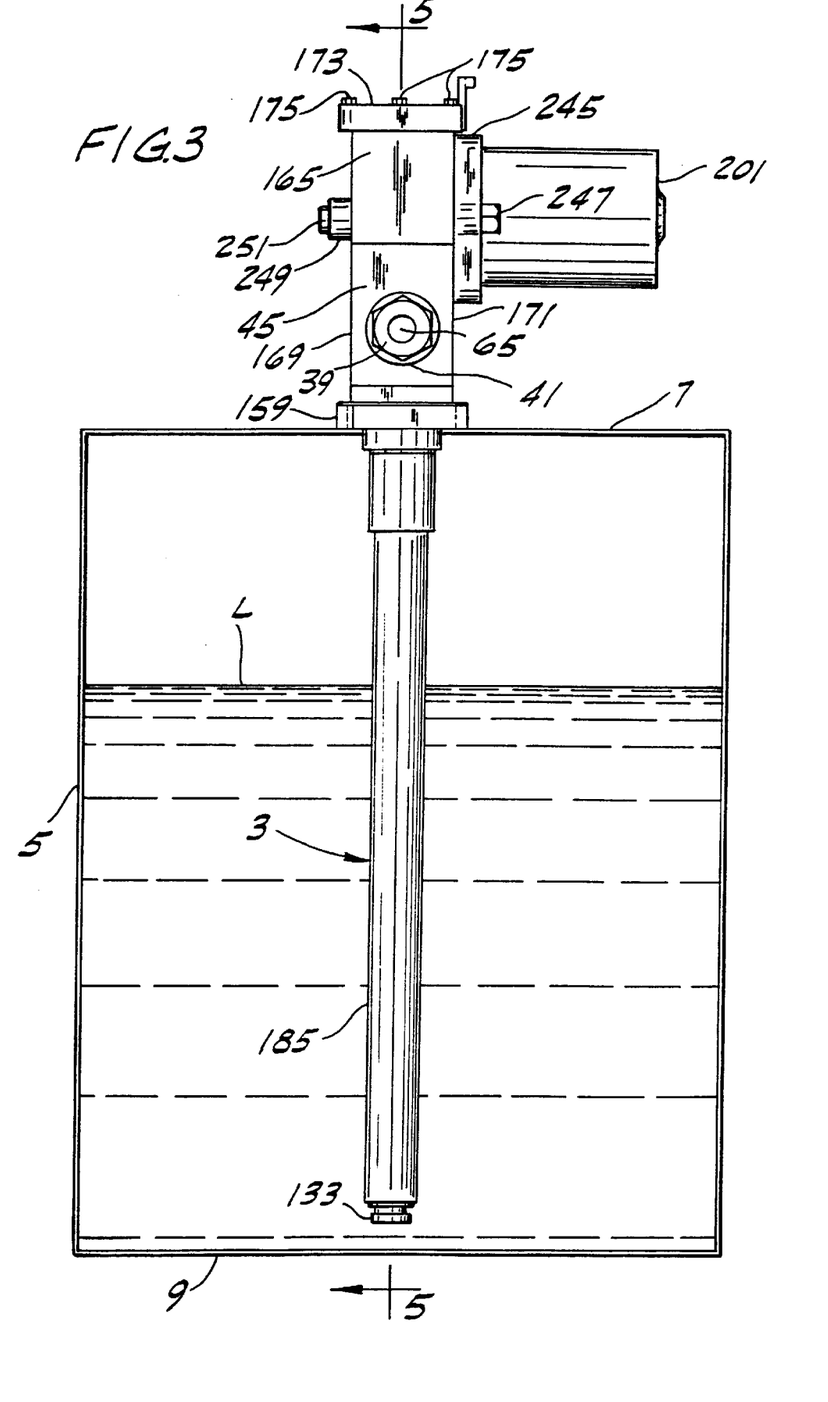
FIG. 3 is a view of the pump in side elevation on line 3—3 of FIG. 1 on a smaller scale than FIG. 1, illustrating the pump in place for pumping lubricant (e.g. grease) from a container of lubricant.
Figure 4:
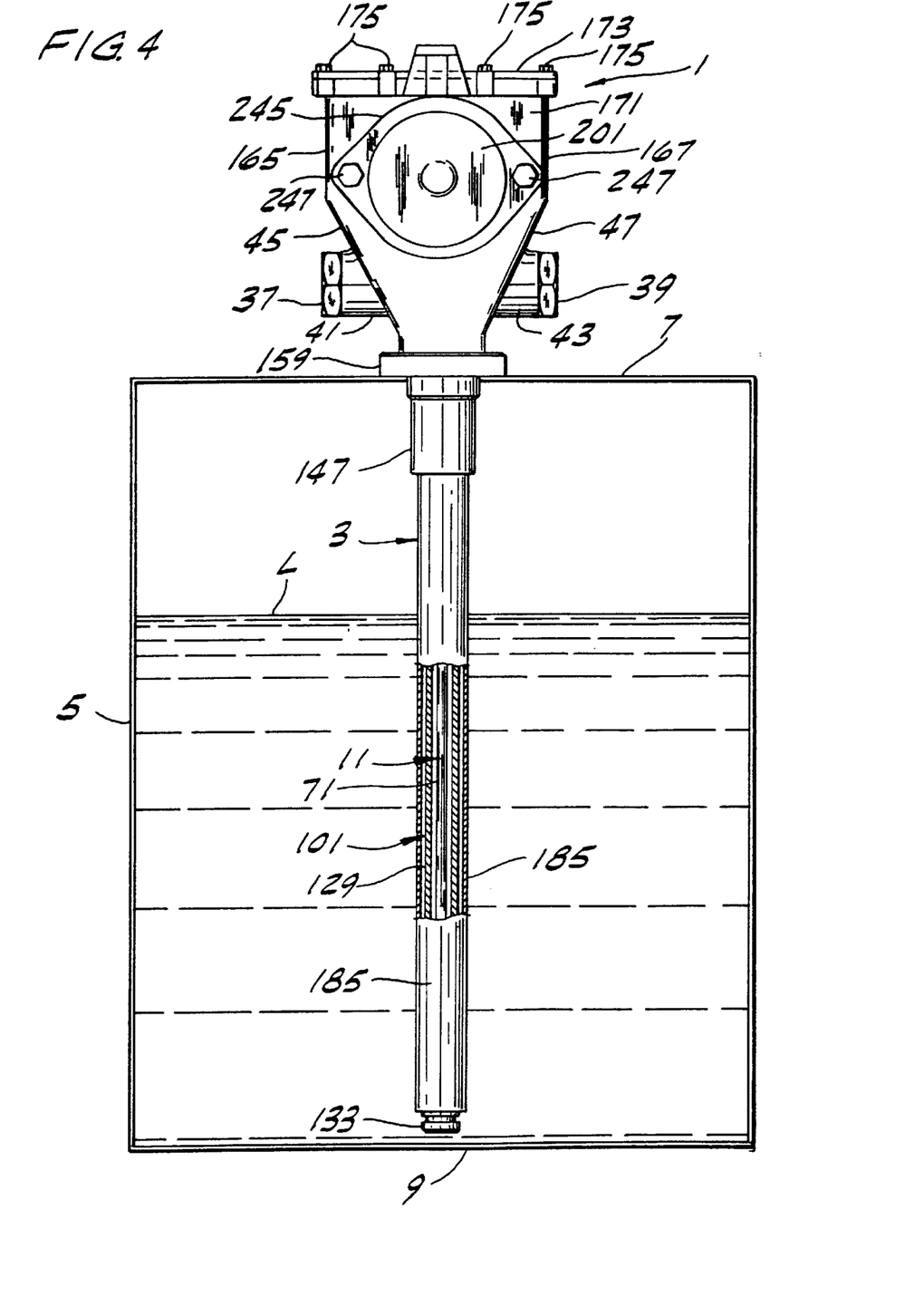
FIG. 4 is a view of the pump in side elevation on line 4—4 of FIG. 1, on the scale of FIG. 3, also illustrating the pump in place for pumping lubricant from a container, and with parts broken away and shown in section.
Figure 8:
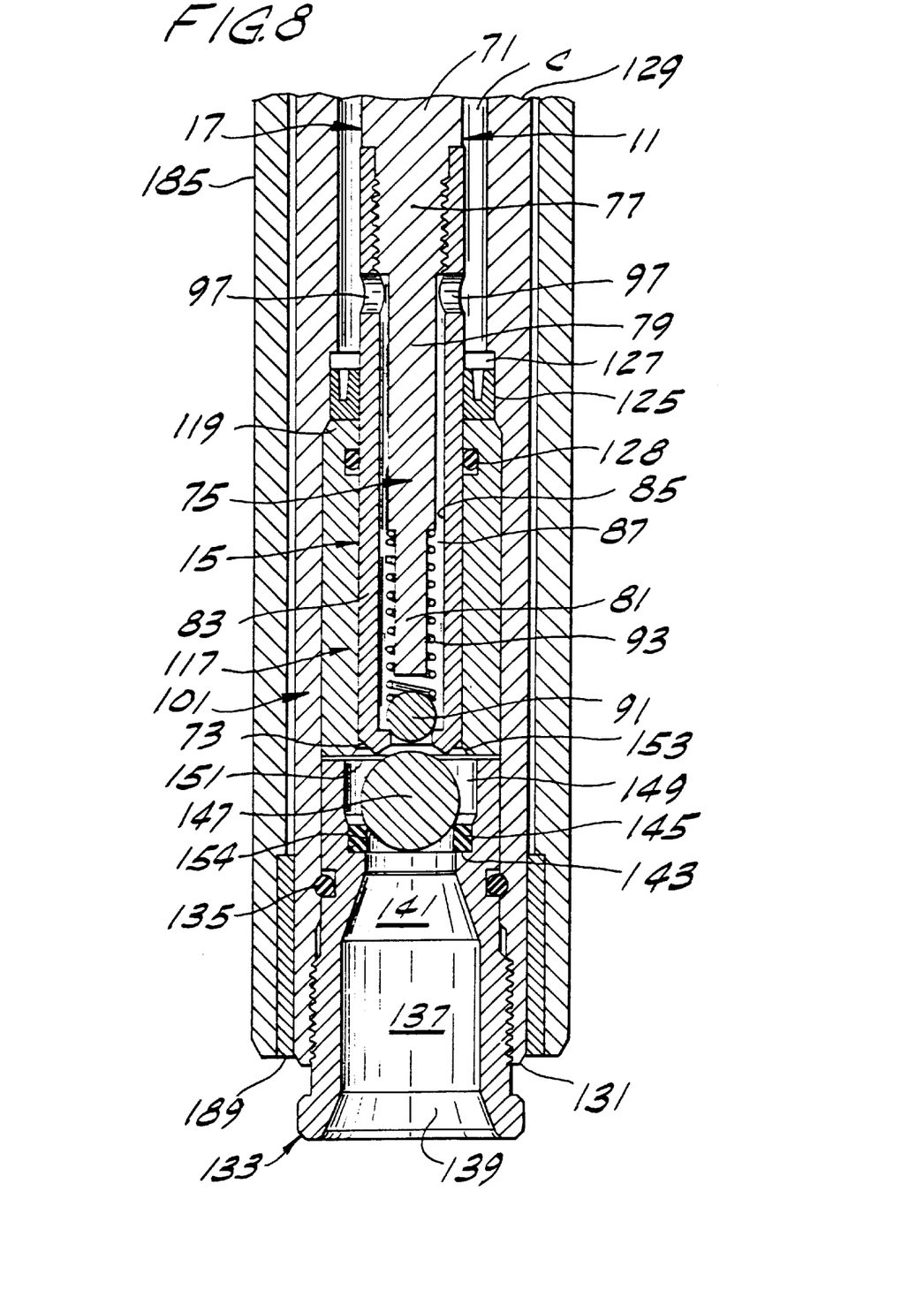
FIG. 8 is an enlargement of part of FIG. 5.
Figures 9, 10, 11:
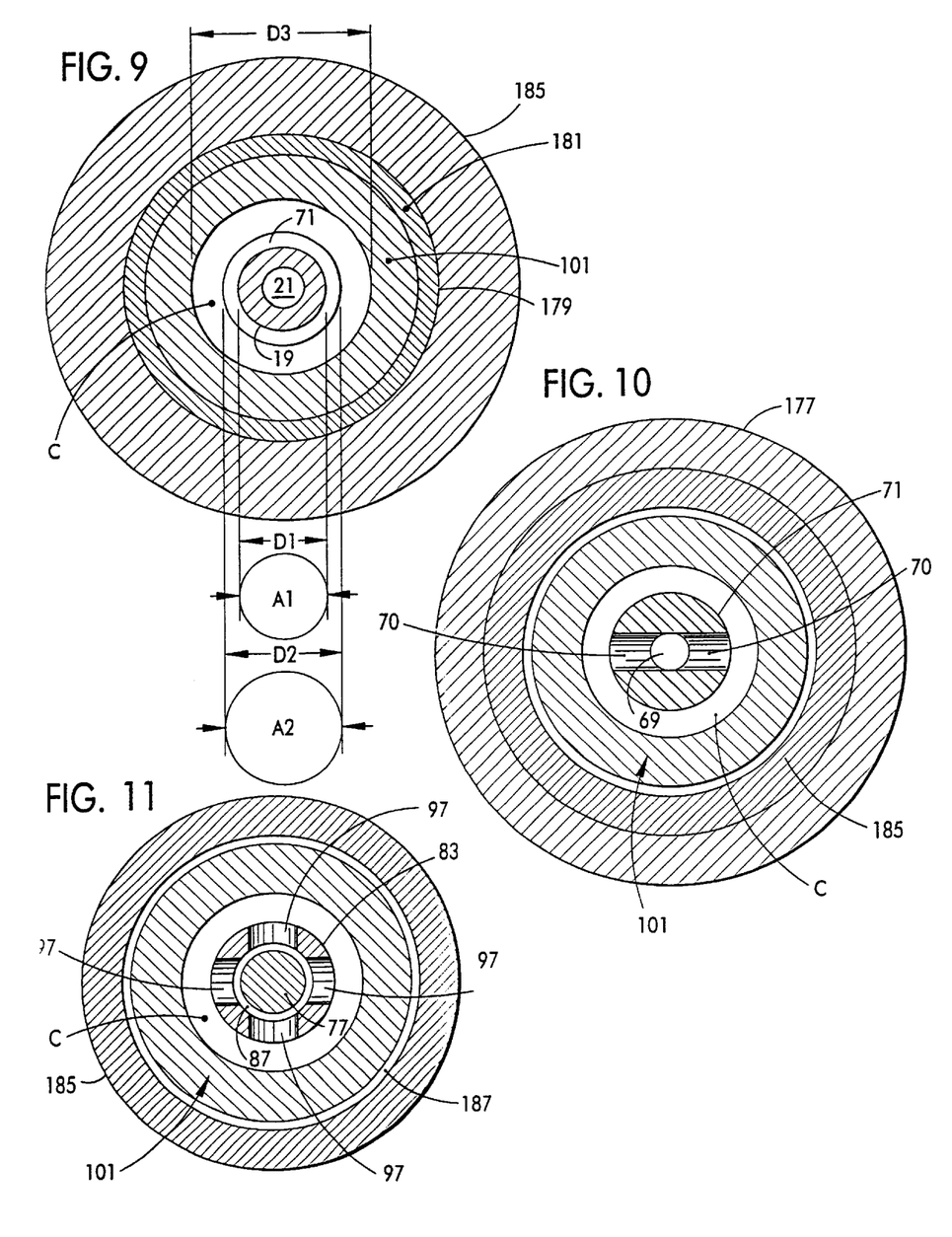
FIGS. 9, 10, 11 and 12 are views in horizontal section on lines 9—9, 10—10, 11—11 and 12—12, respectively, of FIG. 5, on a larger scale than FIG. 5.

Referring to the drawings, and first to FIGS. 1–14, a pump of this invention, constructed particularly for pumping lubricant especially grease from a supply thereof, is shown to comprise a hollow head or housing indicated in its entirety by the reference numeral 1 adapted for placement adjacent (above in FIG. 3) the supply, and a lance structure indicated in its entirety by the reference numeral extending outward (down in FIG. 3) from the head 1 into the supply of lubricant L. As indicated in FIGS. 3 and 4, the supply may be contained in a container such as a drum 5, the head 1being mounted on the lid 7 of the drum with the lance structure 3 extending down into the drum generally to the bottom 9 of the container through a hole in the lid 7. Here it is to be noted that, while the pump has been developed particularly for pumping lubricant and especially grease, it is adapted to pump other pumpable products in general. An elongate member constituting a pump rod or plunger, designated in its entirety by the reference numeral 11, extends down from the head 1, having an inner (upper in FIG. 5) end portion 13, an outer (lower) end portion 15 and an intermediate portion 17, these portions being colinear on the vertical central axis of the lance structure 3. As shown, the upper end portion 13 of the plunger 11 comprises a relatively short tubular element constituted by a tube 19 the bore 21 of which extends all the way from its lower end 23 to its upper end 25. The latter extends into a pipe 27 extending crosswise of the head 1. Tube 19 may be referred to as the outlet tube. The cross-pipe 27, which may be referred to as the outlet pipe, has reduced-diameter ends 29 and 31 fixed in bores 33, 35 of tubular retainers 37, 39 threaded in tubular formations 41, 43 extending horizontally outward from opposite inclined walls 45, 47 of the head 1, the tubular retainers being sealed in the tubular formations 41, 43 by O-rings as indicated at 49. The reduced-diameter ends 29, 31 of the cross-pipe 27 are sealed in the bores 33, 35 of the tubular retainers 37, 39 by O-rings as indicated at 51. The upper end 25 of the tubular element or outlet tube 19 is fixed in a vertical opening 53 in the cross-pipe 27 extending up from the bottom of the cross-pipe 27, this opening 53 terminating short of the top of cross-pipe 27. The tube 19 has a flange 57 engaging the bottom of the cross-pipe 27 and is sealed in the opening 53 by an O-ring 59. The bore 21 of tube 19 opens at its upper end 25 to the bore 61 of the cross-pipe 27 for flow of product being pumped (as will appear) up through the bore 21 of tube 19 to the bore 61 of cross-pipe 27 and thence out of bore 61 of cross-pipe 27 to the right as shown by the arrows in FIG. 5, the left end of the cross-pipe 27 being plugged as indicated at 65. As particularly illustrated in FIG. 9 the tube 19 has an outside (external) diameter D1 and an overall area A1 in transverse cross section (the entire area bounded by the outer periphery of the tube 19). It has a reduced-diameter lower end portion suitably fixedly received in a cylindric recess 67 in the upper end 71 a of the stated intermediate portion 17 of the plunger 11. For outflow of product being pumped into the lower end of the bore 21 (constituting an outlet passage) in the tube 19 and thence upwardly therethrough, the upper end 71 a of the intermediate portion 17 of the plunger 11 has a short axial passage 69 extending down from the bottom of the recess 67 and lateral ports 70 just below the bottom of the recess 67 for communication from the space (to be subsequently described) surrounding said intermediate portion 17 to passage 69 and thence to outlet passage 21 in tube 19.

The intermediate portion 17 of the pump plunger 11 comprises an elongate solid cylindrical plunger member or rod 71 considerably longer than the outlet tube 19. Thus, or example, the entire pump plunger 11 may measure generally 19.15 inches from the upper end of outlet tube 19 to the lower end of the pump plunger 11 indicated at 73 (see particularly FIG. 8) and the tube 19 may measure generally 4.0 inches from its upper end 25 to the upper end at 71 a of the elongate member or rod 71. Member 71 per se is of uniform circular cross section with a diameter D2 (see FIG. 9) throughout most of its length extending down from tube 19, and has a lower end extension designated in its entirety by the reference numeral 75 having an upper reduced-diameter portion 77, an intermediate portion 79 further reduced in diameter, and a lower end portion 81 still further reduced in diameter terminating at its lower end. The stated lower end portion 15 of the pump plunger 11 comprises an elongate cylindric sleeve 83 surrounding the lower end extension 75 of the solid rod member 71 having essentially the same external diameter as the diameter D2 of the solid rod member 71. Thus, the external surface of the pump plunger 11 throughout its intermediate portion and lower end portions 17, 15 is cylindrical, i.e. of uniform circular form in transverse cross-section, of diameter D2, with a cross-sectional area A2 (see particularly FIG. 9).

The sleeve 83 has an elongate cylindrical bore 85 extending axially from adjacent its lower end (which is the lower end 73 of the pump plunger 11) to its upper end. The bore 85 has a diameter corresponding to the diameter of the upper end portion 77 of the lower end extension 75 of the solid rod member 71. The sleeve 83 is secured at its upper end on the upper end portion 77 of extension 75, extending down from portion 77 and providing an annular space 87 between the intermediate and lower portions 79 and 81 of extension 75. The sleeve 83 is of such length that its lower end, constituting the lower end 73 of the pump plunger 11, is spaced down from the lower end of the lower end portion 81 of extension 75, being formed at said lower end 73 as a check valve seat with a check valve port 89 (see FIGS. 13 and 14) which may be referred to as the inlet port. A ball check valve 91 is biased downwardly against the seat to close the port 89 by a coil compression spring 93 surrounding the lower end portion 81 of the extension 75 reacting from the shoulder at the lower end of intermediate portion 79 of extension 75. As will become clear, the annular space 87 constitutes a passage for flow of lubricant upwardly therethrough from the inlet port 89 to the upper end of said annular space or passage 87 at the upper end of the intermediate portion 79 of extension 75 (the lower end of upper portion 77 of extension 75) where the sleeve has lateral ports 97 for lateral exit of lubricant from the passage 87.

Figure 5:
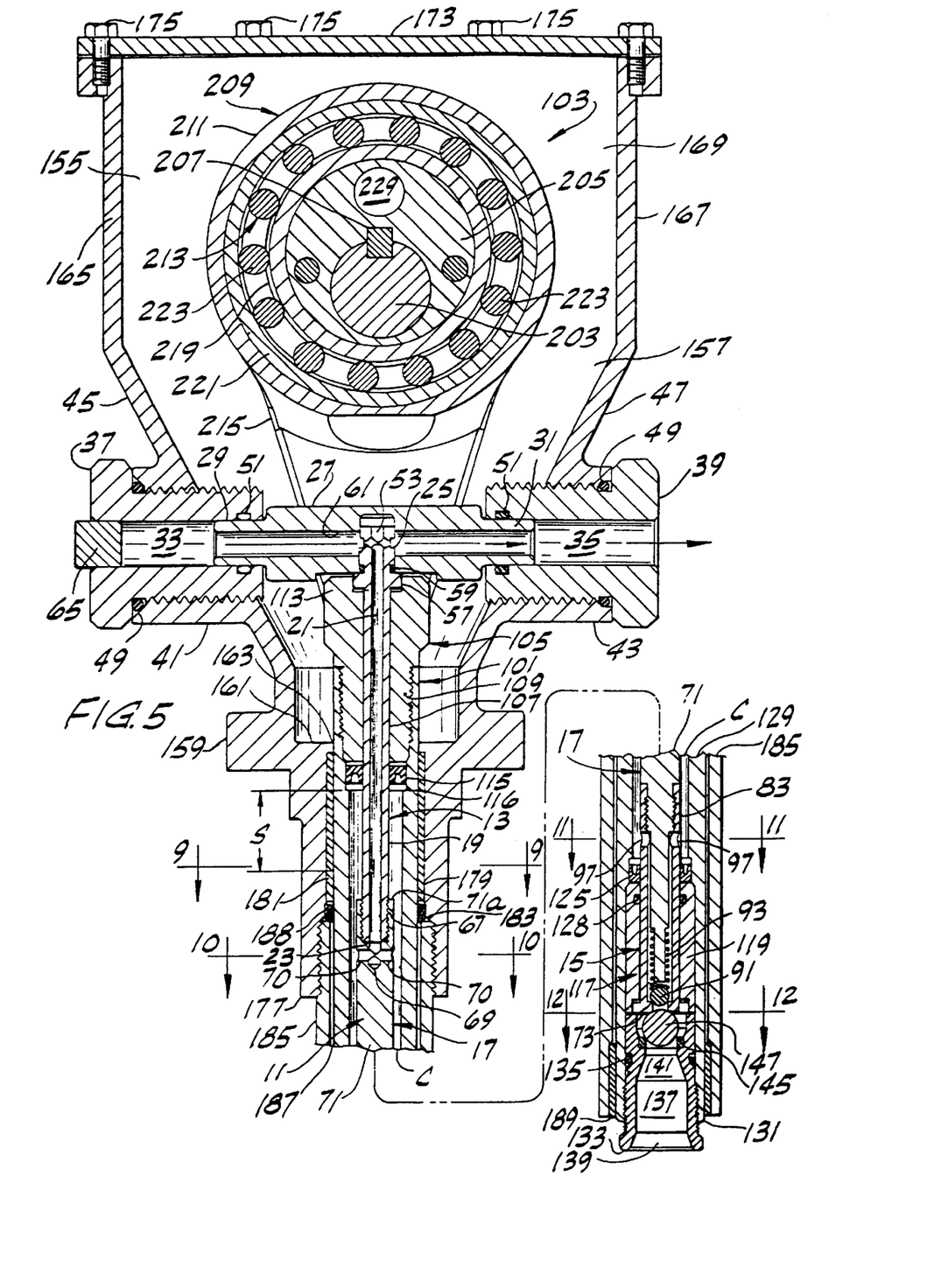
FIG. 5 is a vertical section on line 5—5 of FIGS. 1 and 3 on the scale of FIGS. 1 and 2 showing the pump tube of the pump in raised position at the upper end of its stroke.
Figure 6:
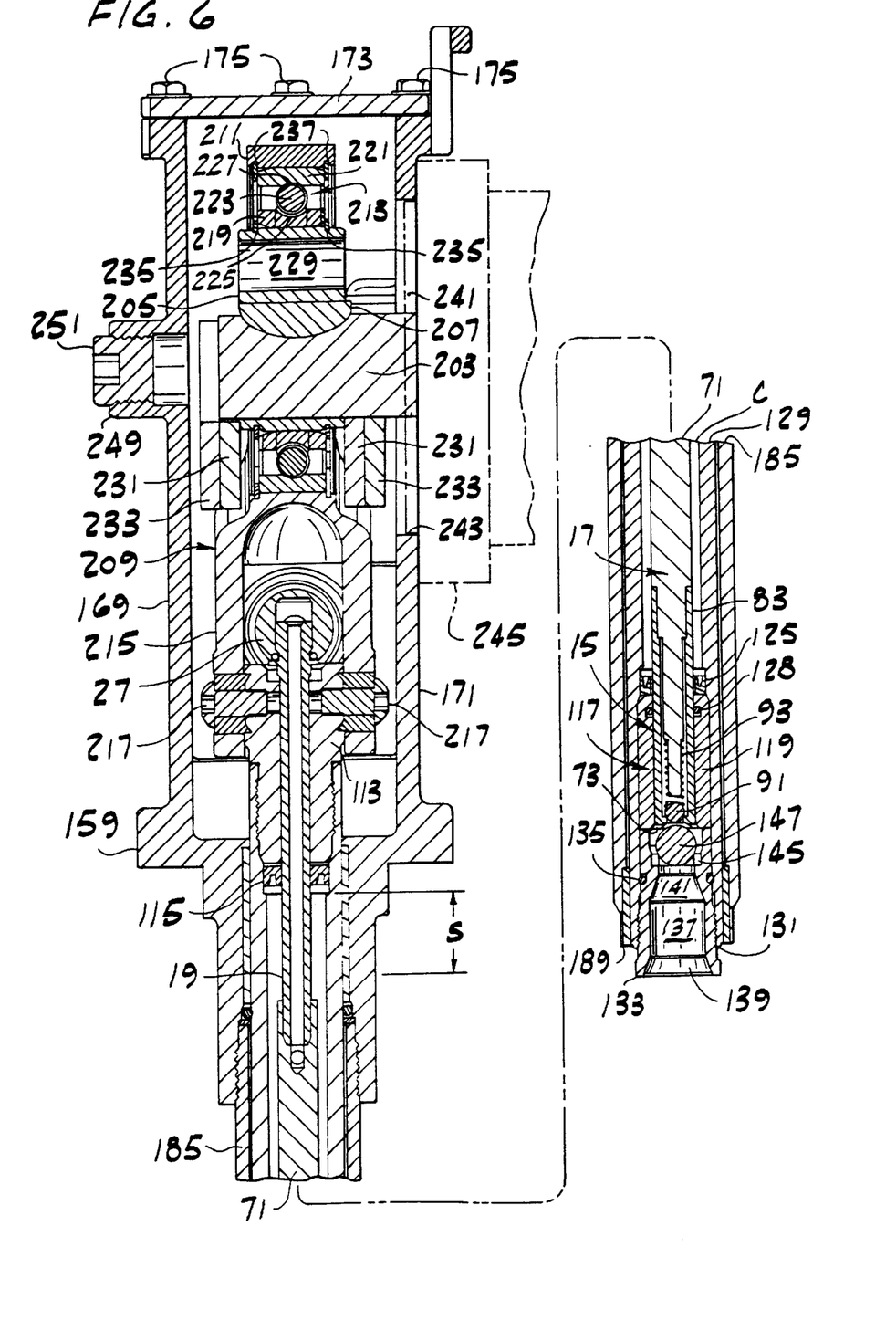
FIG. 6 is a vertical section on line 6—6 of FIG. 1, with parts broken away.
Figure 7:
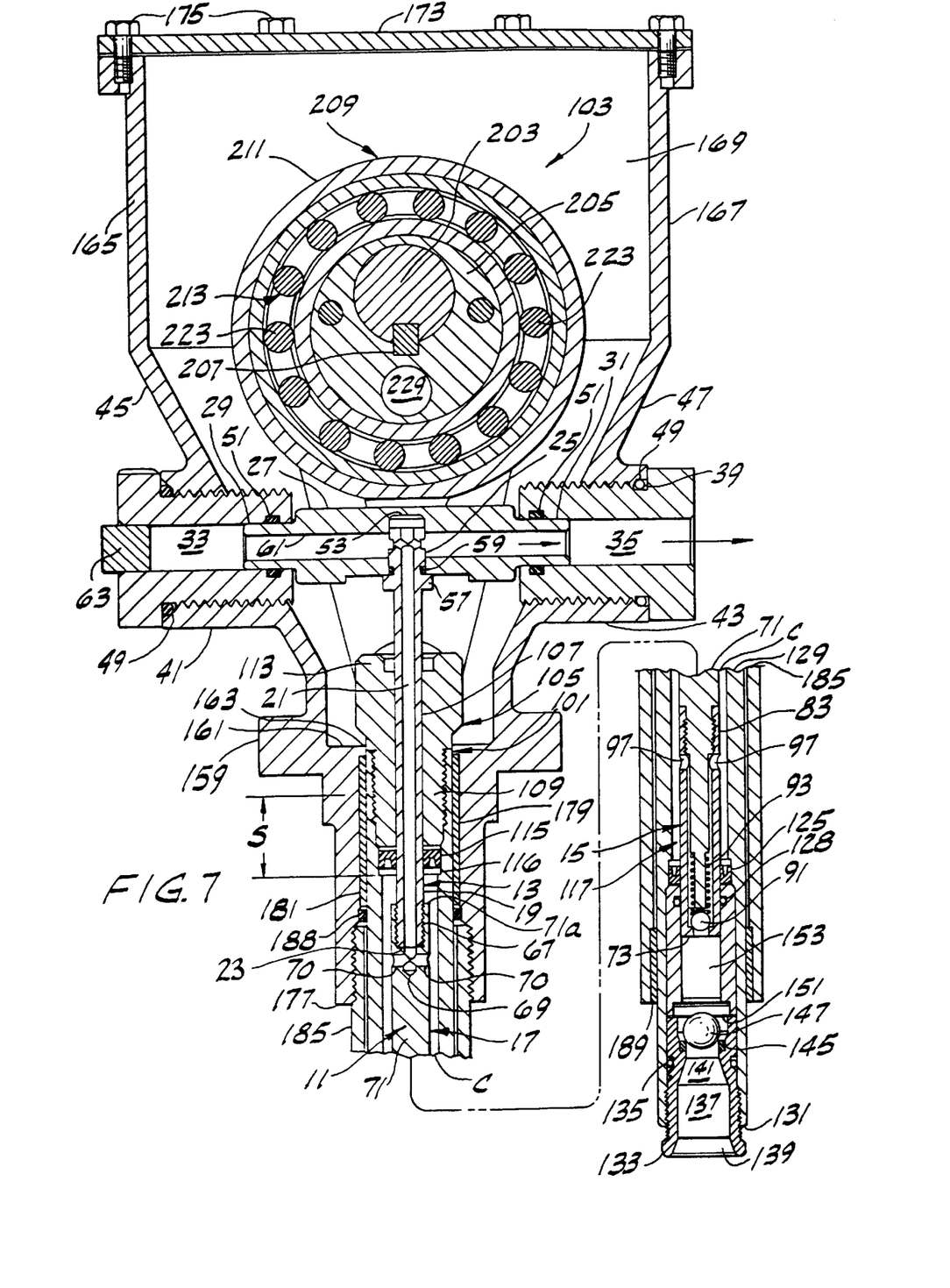
FIG. 7 is a view corresponding to FIG. 5 showing the pump tube in lowered position at the lower end of its stroke.

An elongate pump tube indicated in its entirety by the reference numeral 101 surrounds the pump plunger 11 extending down from adjacent the upper end thereof and reciprocable up and down through a pump stroke relative thereto. Motor-driven means indicated generally at 103 is carried by the head for reciprocating the pump tube 101 through a pump stroke between the inward (raised) position relative to the fixed pump plunger 11 in which the pump tube 101 is illustrated in FIGS. 5, 6 and 8 and the (outward)

lowered position relative to the pump plunger in which it is illustrated in FIG. 7. By way of example, in an embodiment with the pump plunger 11 19.15 inches long from its upper end to its lower end and with diameter D1 0.275 inch, diameter D2 0.390 inch, and with the pump tube 101 18.8 inches long from its upper (inner) end to its lower (outer) end, and having an internal diameter 0.562 inch, the pump stroke, indicated at S in FIGS. 5–7, may be 0.75 inch.

The pump tube 101 has an upper (inner) end closure indicated in its entirety by the reference numeral 105 slidable up and down on the upper end portion 13 of the pump plunger, i.e. on the outlet tube 19, in sealed relation thereto. This upper end closure 105 comprises a cylindric member having a bore 107 dimensioned for sliding on the tube 19, this cylindric member having a lower (outer) portion or stem 109 fixedly fitted in the upper end of the pump tube and an upper (inner) head portion 113 on the stem. A seal 115 constituted by a ring of elastomeric material is provided at the lower end of the stem 109 of the closure member 107, the ring being held in place at the lower end of the stem as indicated at 116 surrounding the tube 19, being slidable on the tube in sealed relation thereto. As shown, the ring 115 may be of U-shape in cross-section in a radial plane thereof, and may be referred to as a cup seal.

The pump tube 101 has a lower (outer) closure indicated in its entirety by the reference numeral 117 slidable up and down on the lower end portion 15 (sleeve 83) of the pump plunger 11 closing the pump tube above the lower end of the pump tube. This closure 117 comprises an elongate generally cylindric tubular member 119 fixedly fitted in the pump tube adjacent but spaced above the lower (outer) end of the pump tube. A seal constituted by a ring 125 of elastomeric material is provided at the upper end of closure member 119, the ring being held thereon by a retainer as indicated at 127. The ring 125 surrounds the sleeve 83, being slidable thereon in sealed relation thereto, and may be a cup seal as shown (of U-shape in cross section in a radial plane). An O-ring seal is indicated at 128. The pump tube 101 is of larger internal diameter D3 and larger internal cross-sectional area than the pump plunger 11 throughout the length of the pump tube between its upper and lower closures 105 and 117 thereby defining an elongate annular pump chamber indicated generally at C between the surface of the fixed pump plunger 11 and the interior surface of the pump tube extending from the upper closure to the lower closure. The pump tube 101 is of such length relative to the pump plunger 11 as to extend down below the lower end 73 of the pump plunger 11 not only in its lowered position (FIG. 7) but also in its raised position; and is of larger internal cross-section than the cross-section of portions 17 and 15 of the pump plunger 11 throughout the length thereof.

Figure 12:
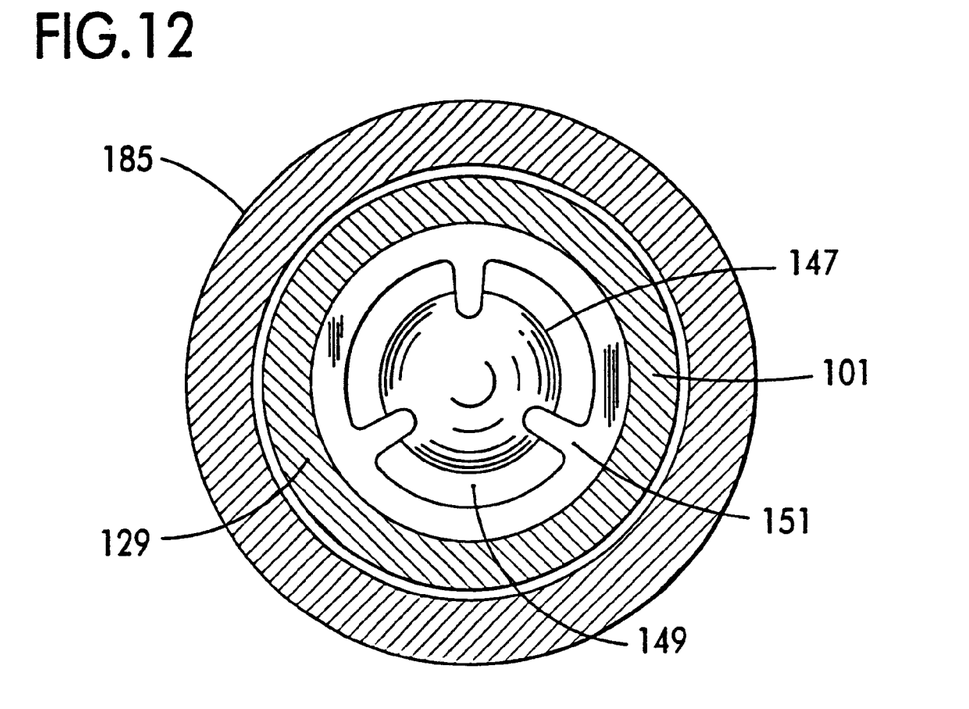

The pump tube 101 comprises an elongate tubular member 129 which, in its raised position shown in FIGS. 5 and 6, extends all the way down from its upper end closure 105 to and for some distance below the lower end of the lower closure member 119, the lower end of said member 129 being indicated at 131. Fitted in the lower end portion of tubular member 129 is a tubular cylindric check valve fitting 133. This fitting is fixed in the lower portion of tubular member 129 with an O-ring seal as indicated at 135 and extends down out of the lower end 131 of member 129, having a passage 137 extending up from its lower end, where it is open as indicated at 139. Passage 137 has a tapered throat 141 forming an internal annular shoulder 143 on which is provided an annular valve seat 145 for a ball check valve 147 constituting an inlet check valve. The valve seat 145 and the ball 147 occupy an upwardly opening recess 149 in the upper end of the fitting 133, the ball being retained in the recess by a retainer 151 fixed on the upper end of the fitting 133. The ball retainer is formed as shown in FIG. 12 to allow the ball to move up off the ball seat 145 and provide for flow of lubricant up around the ball to the space in the pump tube 101 below the lower end at 73 of the fixed plunger 11, said space constituting an expansible and contractible lower end chamber 153. The opening or inlet port 154 in the ball seat 145 has an area at least 70% of the cross-sectional area of the pump plunger 11 at the lower end 73 of the pump plunger, i.e. at least 70% of area A2, for the purpose of reducing the pressure drop across the seat 145.

The head 1 has an upper portion 155 of generally rectangular shape in horizontal section and a lower portion 157 tapering down toward its lower end where it has an outwardly extending flange 159 serving as a base for mounting the head on the lid 7 of a drum 5 containing lubricant with the lance structure 3 of the pump extending down through a hole in the lid generally to the bottom of the drum, and further has a bottom part 161 having a central circular opening 163 therein. The inclined walls 45, 47 of the head extend down from vertical upper walls 165, 167 and the head further comprises side walls 169, 171 having tapered lower portions which in conjunction with the inclined walls 45, 47 define the tapering lower portion 157 of the head. The head is closed at the top by a top plate 173 secured to the walls of the head as indicated at 175. A tubular stem 177 extends from the base, this stem having an opening or bore 179 extending axially therethrough from its lower to its upper end at the circular opening 163 in the bottom closure 161 of the head.

The pump tube 101 extends down (outward) from within the tapered lower portion 157 of the head through the opening 163 at the bottom of said lower portion and thence down through the stem 177, being slidable in a bronze brushing 181 lodged in the bore 179 in the stem. The bore 179 in the stem has a counterbore 183 extending up from its lower end in which is affixed the upper end of an elongate tubular casing 185 constituting part of the lance structure 3 which extends down from the head (more particularly from the lower end of the stem) surrounding the pump tube 101 generally all the way down to a level just above the lower end 131 of the pump tube when the pump tube is in its raised position at the upper end of its stroke in which it is illustrated in FIGS. 5, 6and 8. The casing 185 is of larger internal diameter than the external diameter of the pump tube so that there is an elongate annular space 187 therebetween. At 188 is indicated an O-ring seal at the upper end of the tubular casing 185. The pump tube 101 (more particularly the elongate tubular member 129) is sealingly slidable in a bronze bushing 189 fixed in the lower end of the tubular casing 185. The bushing 189 functions as a guide for the pump tube and also as a seal blocking entry of lubricant into the space 187 between the pump tube and the casing.

A motor 201 mounted on the side wall 171 of the head has a rotary output shaft 203 extending horizontally across the head 1, the motor-driven means 103 for reciprocating the pump tube 101 in (upward as shown) and out (downward as shown) through its pump stroke S comprising a rotary-to-reciprocating mechanism interconnecting the rotary output shaft 203 and the upper end of the pump tube 101. In detail, this mechanism is shown to comprise an eccentric 205 keyed on the shaft 203 as indicated at 207 within the head rotary with the shaft on the horizontal axis of the shaft. The eccentric comprises a circular disk eccentrically mounted on the shaft. The motor 201 may be electric or hydraulic, but is preferably a rotary hydraulic motor, more particularly a commercially available rotary hydraulic motor such as a Roller Vane rotor hydraulic motor sold by Parker Hannifin Corp. of Greeneville, Tenn., U. S. A. The rotary-to-reciprocating mechanism further comprises a follower designated in its entirety by the reference numeral 209 comprising a ring 211 surrounding the eccentric with a ball bearing indicated generally at 213 therebetween, and an arm 215 in the form of a yoke or fork extending from the ring straddling the cross-pipe 27 and pin-connected as indicated at 217 to the upper end of the head portion 113 of the upper end closure 105 of the pump tube 101. The ball bearing comprises an inner race 219 surrounding the eccentric 205 and secured thereto for rotation therewith, and an outer race 221 surrounding the inner race secured to the ring 211 on the inside thereof, and a series of balls 223 between the races which roll in grooves 225 and 227 (see FIG. 6) in the inner and outer races, respectively. The eccentric 205 has a hole 229 therein and inner and outer counterbalancing weights 231 and 233 secured on opposite sides thereof. Retainer rings such as indicated at 235 grip opposite sides of the inner race 219; retainer rings such as indicated at 237 grip opposite sides of the outer race 221. The eccentric/follower mechanism 205/209 is such that on rotation of the eccentric through each revolution thereof, the follower 209 is raised and lowered (it also oscillates back and forth as permitted by the pin connection 217) to reciprocate the pump tube 101 linearly up (inward) and down (outward) through pump stroke S, as determined by the throw of the eccentric (for example, 0.75 inch).

As illustrated, the motor 201 is mounted on the side wall 171 of the head 1by having a circular boss indicated at 241 (FIG. 6) on its end at side wall 171 fitted in a circular opening 243 in side wall 171, and a flange 245 at said end receiving bolts indicated at 247 for fastening the motor to side wall 171. The shaft 203 extends partway across the head 1toward a tubular formation 249 on the side wall 169, this formation being plugged as indicated at 251 in FIG. 6.

As clear from the above and from the drawings, the outside diameter D2 of the intermediate and lower portions 17, 15 of the pump plunger 11is greater than the outside diameter D1 of the outlet tube 19 (the upper end portion of the pump plunger 11), and the overall cross-sectional area A2 of the intermediate and lower portions 17, 15 of the pump plunger is greater than the overall cross-sectional area A1 of the outlet tube 19. More specifically, D2and D1 are such that the area A2 is twice A1. By way of example, D2 may be 0.390 inch, D1 may be 0.275 inch, area A2 thereby being 0.120 square inches and area A1 being 0.060 square inches.

Figure 13:
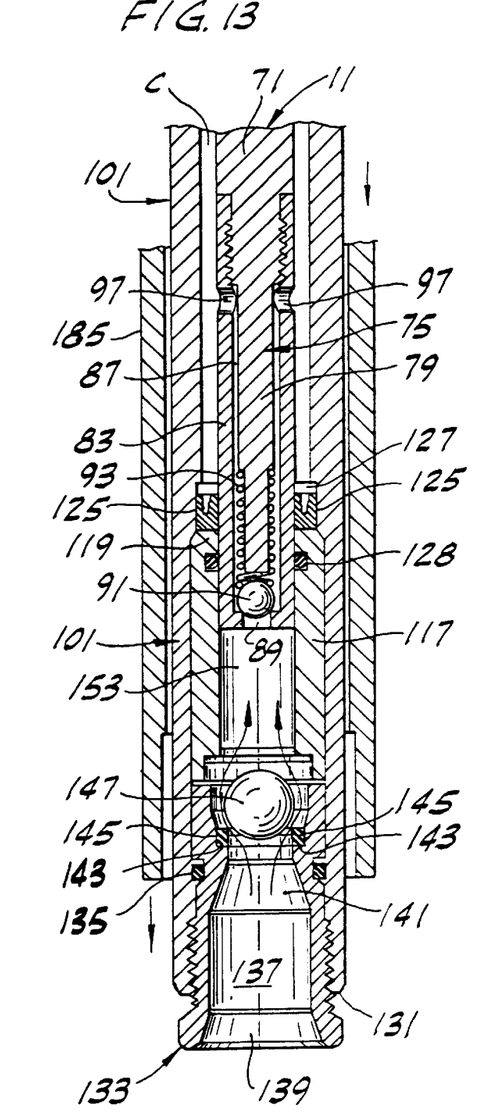
FIG. 13 is a fragmentary view showing check valves of the pump in the position occupied in an intermediate position of the pump tube in its downstroke.

The pump is operable in cycles, each occurring on a revolution of the eccentric 205, and each of which may be regarded as starting with the pump tube 101 in its uppermost raised position at the upper end of its stroke S shown in FIGS. 5 and 6, as a result of the eccentric being at that point in a revolution thereof where its high point is uppermost and its low point is down. With the pump tube 101 in its stated raised position, the seal 115 of its upper end closure 105 is in the raised position in which it appears in FIGS. 5 and 6 a distance somewhat greater than S above the upper end 71a of member 71, and the seal 125 of its lower closure 115 is in the raised position in which it appears in FIG. 5, 6 and 8 a distance greater than S above the lower end 73 of the plunger 11. Chamber C is fully charged with lubricant as a result of the preceding cycle (as will be described). The inlet check valve ball 147 is in its fully raised (inward) position in close proximity to the lower (outer) end 73 of the plunger and the lower (outer) chamber 153 is in its fully contracted state. As illustrated in FIGS. 5, 6 and 8, ball check 91 is closed. Passage 87 is full of lubricant, check valve ball 91 being closed down on its seat as illustrated in FIGS. 5, 6and 8. On rotation of the eccentric 205 from its FIG. 5 position, the pump tube 101 is driven downward, its lower end including the check valve fitting 133 plunging down into the lubricant L. As illustrated in FIG. 13, chamber 153 expands, the ball check 147 opens for entry of lubricant to fill the chamber 153 as it expands, and the ball check 91remains closed. As the pump tube is driven down (outward) through its downstroke a portion of the outlet tube 19 (constituting the upper end portion of the plunger) equal in length to the pump stroke S is, in effect, withdrawn from the pump chamber C and a portion of the lower end portion of the plunger equal in length to the pump stroke S is, in effect, entered in the pump chamber. Thus, a volume equal to the pump stroke times the cross-sectional area A1 of the tube 19(S×A1) is withdrawn from the pump chamber and a volume equal to the pump stroke times the cross-sectional area A2 of the lower end portion of the plunger (S×A2) is entered in the pump chamber, to the effect that a volume of lubricant equal to S×A2 minus S×A1 is delivered through the passage 21 in tube 19 to the outlet pipe 27. Since A2=2A1, the volume discharged from the pump chamber equals S×A1 (pump stroke times the cross-sectional area A1 of the upper end portion of the plunger.

As the eccentric rotates through the first half of a revolution from its FIG. 5 position to its FIG. 7 position, the pump tube 101 moves down through its downstroke (outward stroke). As it moves downward (outward), its lower end cuts through the lubricant and, particularly in the case where the lubricant is grease (and thick heavy viscous grease) expedites the loading of the lower chamber 153 which, at the lower end of the downstroke of the pump tube is expanded to its full extent as shown in FIG. 7 and completely filled with lubricant.

Figure 14:
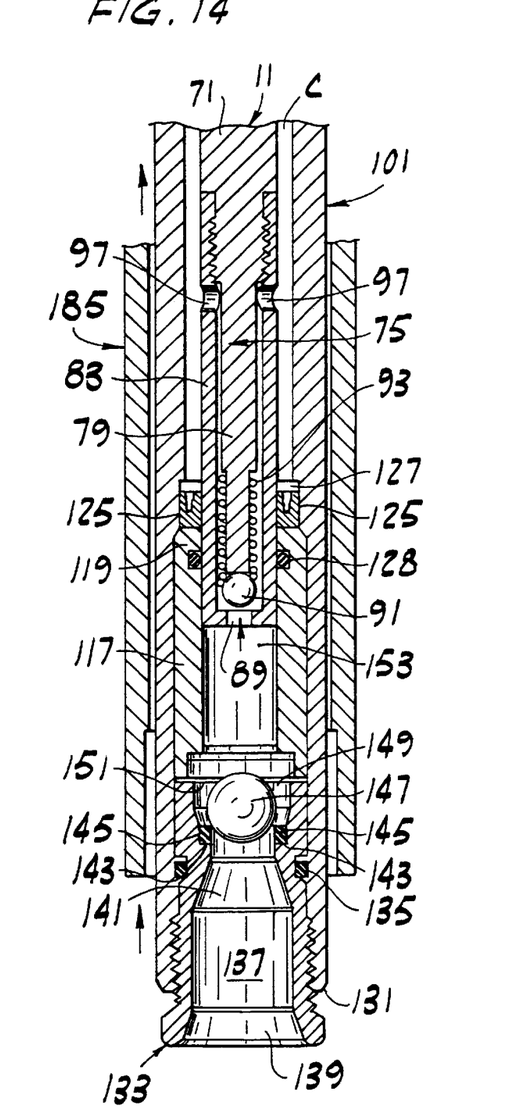
FIG. 14 is a view similar to FIG. 13 showing the check valves in the position occupied in an intermediate position of the pump tube on an upstroke.

As the eccentric rotates through the second half of a revolution, i. e. from the point where its high point is down and its low point is up as shown in FIG. 7 back to the point where its high point is up and its low point is down as shown in FIG. 5, it pulls the pump tube back up through an upstroke (inward stroke) of length S. As the pump tube 101 moves up, the lower ball check 147 closes, and lubricant is forced up from chamber 153, opening the check valve 91 as shown in FIG. 14, and lubricant is delivered from chamber 153 through passage 87 and ports 97 to the pump chamber C. Also, as the pump tube 101 moves up, a portion of the length of the outlet tube 19 (constituting the upper end portion of the plunger 11) equal to the stroke S is in effect re-entered in the pump chamber C and a portion of the length of the lower end portion of the plunger equal to the stroke S is in effect withdrawn from the pump chamber. Thus, a volume equal to the pump stroke S times the cross-sectional area A1 of tube 19 (S×A1) enters the pump chamber. In addition, a volume equal to S×A2 is transferred from chamber 153 to pump chamber C through passage 89 to the effect that a volume of lubricant equal to S×A2 minus SA1 is delivered through passage in tube 19 to the outlet pipe. Here again, since A2=2A1, the volume discharged from the pump chamber equals S×A1 (the same as on a downstroke). The chamber 153, which may be referred to as the intake chamber, is at least 85% exhausted on the upstroke, i. e. it is unswept no more than 15%, to take care of use of the pump to pump grease having air in it. With the intake chamber 153 unswept less than 15%, reduction of pump output which might otherwise be caused because of air in the grease is avoided.

The pump as above described with the fixed plunger 11 and reciprocable pump tube 101 is capable of reliable operation at relatively high speed, e. g. 600 cycles (600 strokes of the pump tube) per minute, even with heavy viscous grease at low temperatures. It is operable with a relatively short stroke, e. g. a 0.75 inch stroke as above noted, and acts to deliver a metered volume S×A1 of lubricant on each downstroke (outward stroke) as well as on each upstroke (inward stroke) of the pump tube.

While the pump head 1 described above is mounted above the supply of lubricant L, and the lance structure 3 extends down from the head into the supply, it will be understood that the present invention is not limited to this specific arrangement. The pump can be mounted in other orientations, such as the one shown in FIGS. 15 and 16 where the pump, generally designated 300, has its head 301 mounted at one side of a container 303 holding a supply of lubricant, and where the lance structure 305 of the pump extends generally horizontally outward from the head into the supply. The construction and operation of this pump 300 is identical to that described above, except that an electric motor 309 is the preferred (but not exclusive) means for reciprocating the pump tube in and out relative to the pump head (a stroke away from the head being an outward stroke corresponding to a downstroke and a stroke toward the head being an inward stroke corresponding to an upstroke).

Figure 15:
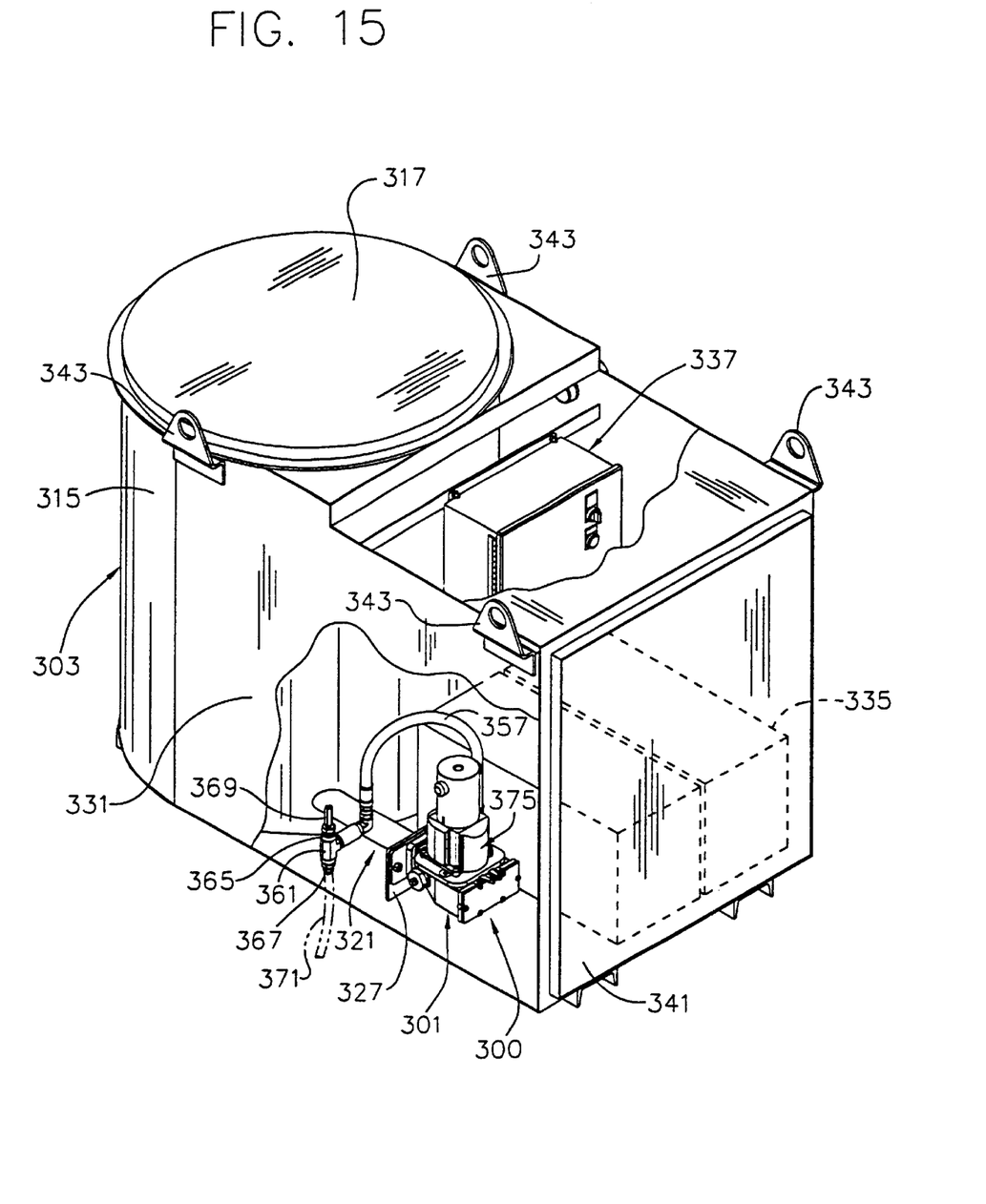
FIG. 15 is a perspective view illustrating the pump head mounted at one side of a container holding a supply of lubricant wherein the lance structure of the pump extends generally horizontally outward from the pump head into the supply.

The container 303 shown in FIG. 15 has a cylindric side wall 315, a lid 317 for closing the open top of the container, and a pump mount 321 adjacent the lower end of the side wall for mounting the pump 300 at one side of the container. The pump mount 321 comprises a horizontal tubular fitting 325 affixed (e. g., welded) at one end to the side wall 315 of the container 303, and a mounting flange 327 affixed (e. g., welded) to the other end of the fitting 325. A housing 331 extends from one side of the container 303 and houses the pump 300 and other accessories, such as a pump power supply 335 and pump controller 337 (e. g., a programmable logic controller). The housing 331 has a hinged door 341 which can be locked closed for security. A plurality of apertured lugs 343 are provided on the housing 331 for use in transporting the housing and its contents by means of a crane or the like.

Figure 16:
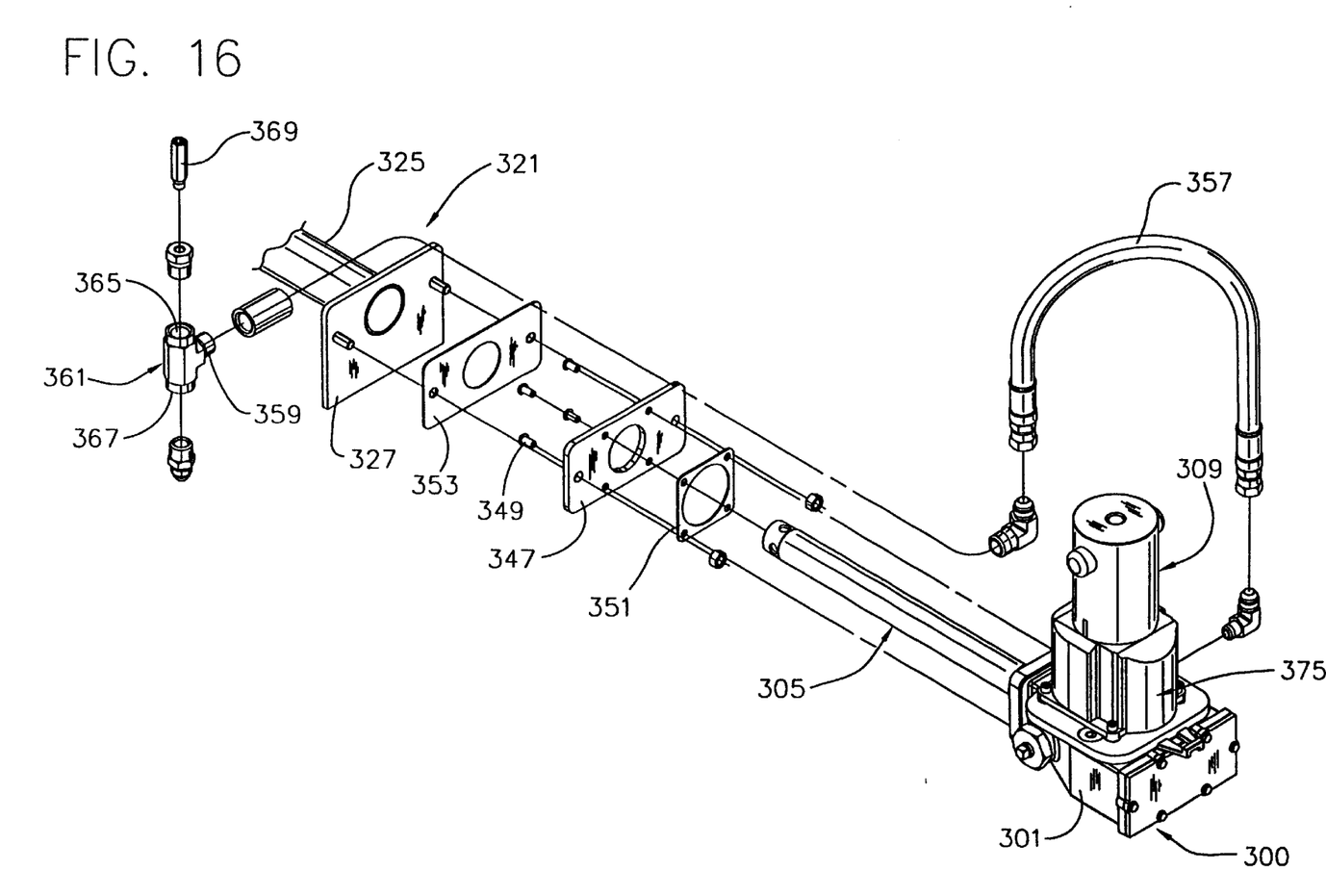
FIG. 16 is a partially exploded perspective view of the pump in FIG. 15.

As shown in FIG. 16, the pump head 301 is fastened to the mounting flange 327 of the pump mount 321 by means of an adaptor plate 347 and suitable fasteners 349 in a position wherein the lance structure 305 of the pump 300 extends outwardly from the pump head 301 through the tubular fitting 325 into the interior of the container 303 for communication with a supply of pumpable material (e. g., lubricant) therein. Gaskets 351, 353 are provided between the pump head 301 and the adaptor plate 347 and between the adaptor plate and the mounting flange 327 for sealing against leakage. The outlet of the pump 300 is connected by a flexible line 357 to the inlet 359 of a T-fitting 361 secured to the housing 331, the inlet being on the inside of the housing. The T-fitting 361 has two outlets 365, 367 on the outside of the housing 331, one connected to a relief valve 369 and the other to a feed line 371 for feeding material from the container 303 to a remote location.

The motor 309 is preferably an electric motor, as noted above, such as a 0.125 horsepower (at 1750 rpm) 90 volt dc motor sold by RAE Corporation with a suitable gear reducer 375 connecting the output of the motor to the input shaft of the pump 300. The gear reducer may have a 17.5:1 ratio for an output shaft speed of 100 rpm. Drives other than an electric motor may also be used.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pump for pumping a pumpable product, particularly lubricant including grease, said pump comprising:
   a head;
   an elongate member constituting a pump plunger extending outward from the head having an inner end adjacent the head and an outer end remote from the head;
   said plunger being fixed at its inner end with respect to the head;
   an elongate pump tube surrounding the plunger extending outward from adjacent the inner end of the plunger to and outward of the outer end of the plunger and reciprocable in and out through a pump stroke relative to the plunger;
   a motor-driven mechanism associated with the head operable to reciprocate the tube through said pump stroke between an inward position relative to the plunger and an outward position relative to the plunger;
   said tube having an inner end closure slidable in and out on an inner portion of the plunger adjacent the inner end of the plunger in sealed relation thereto;
   said tube having an outer closure slidable in and out on an outer portion of the plunger adjacent the outer end of the plunger in sealed relation thereto, closing the tube inward of its outer end;
   said tube being of larger internal cross-section than the cross-section of the plunger throughout the length of the tube between said closures thereby defining an elongate annular pump chamber between the plunger and tube extending from said inner end closure to said outer closure;
   said tube being open at its outer end and having an inlet check valve adjacent its said open outer end outside the outer end of the plunger defining in conjunction with the outer end of the plunger an expansible and contractible outer end chamber;
   the cross-sectional area of said inner portion of the plunger being different from the cross-sectional area of said outer portion of the plunger;
   the inlet check valve opening on an outward stroke of the tube for entry of the pumpable product to said outer end chamber;
   said pump having a passage for outflow of pumpable product from said elongate annular pump chamber to and through an outlet in the head on an outward stroke and also on an inward stroke of the tube;
   said pump having a passage with a check valve therein adapted to open on each inward stroke of the tube with the inlet check valve closed for delivery of pumpable product from said outer end chamber to said elongate annular pump chamber.

2. A pump as set forth in claim 1 further comprising means for mounting the head in a position at one side of a supply of pumpable material in which the pump plunger and pump tube extend generally horizontally into the supply.

3. A pump as set forth in claim 2 wherein the plunger is of circular cross-section and said inner portion of the plunger is of reduced diameter with respect to the diameter of said outer end portion of the plunger and the bore of the pump tube is of circular cross-section of larger diameter than the outer portion of the plunger throughout the length of the tube.

4. A pump as set forth in claim 1 comprising a motor having a rotary output shaft, and wherein said motor-driven mechanism comprises a rotary-to-reciprocating mechanism interconnecting the rotary output shaft and the inner end of the tube for reciprocating the tube.

5. A pump as set forth in claim 4 wherein said motor is a rotary electric motor.

6. A pump as set forth in claim 1 wherein said check-valved delivery passage is in said outer portion of the plunger.

7. A pump as set forth in claim 6 wherein said diameter and said reduced diameter are such that the cross-sectional area of said outer portion of the plunger is about twice the cross-sectional area of said inner portion of the plunger.

8. A pump as set forth in claim 7 having an elongate tubular casing extending outward from the head surrounding the pump tube, said casing having a seal therein adjacent its outer end in which the pump tube is slidable and which seals the casing from entry therein of pumpable product.

9. A pump as set forth in claim 8 wherein the motor-driven mechanism comprises an electric motor having a rotary output shaft and a rotary-to-reciprocating mechanism interconnecting the rotary output shaft and the inner end of the tube for reciprocating the tube.

10. A pump as set forth in claim 1 wherein said outflow passage is in said inner portion of the plunger.

11. A pump as set forth in claim 10 wherein said inner portion of the plunger comprises a tubular element having a bore in communication with said elongate annular pump chamber providing said outflow passage.

12. A pump as set forth in claim 1 wherein said inlet check valve comprises a valve seat having an inlet port therein and a ball biased against the seat, said inlet port having an area at least 70% of the cross-sectional area of the pump plunger at the outer end of the plunger.

13. A pump as set forth in claim 1 wherein said outer end chamber is exhausted at least 85% on each inward stroke of the pump tube.

14. A pump as set forth in claim 1 in combination with a container for holding a supply of pumpable product, said pump being mounted on or adjacent the container in a position in which the head of the pump is outside the container at one side of the container and the pump plunger and pump tube extend generally horizontally into the container.

15. A combination as set forth in claim 14 further comprising means mounting said pump on the container.

16. A combination as set forth in claim 15 wherein said mounting means comprises a mounting flange on the container and means for fastening the head of the pump to the mounting flange.

* * * * *